(12) United States Patent
Inoue et al.

(10) Patent No.: US 6,381,515 B1
(45) Date of Patent: Apr. 30, 2002

(54) ROBOT APPARATUS

(75) Inventors: Makoto Inoue, Kanagawa; Naoyasu Hosonuma, Saitama; Kyoko Furumura; Kotaro Sabe, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/646,723

(22) PCT Filed: Jan. 25, 2000

(86) PCT No.: PCT/JP00/00342

§ 371 Date: Sep. 21, 2000

§ 102(e) Date: Sep. 21, 2000

(87) PCT Pub. No.: WO00/43168

PCT Pub. Date: Jul. 27, 2000

(30) Foreign Application Priority Data

Jan. 25, 1999 (JP) ............................................ 11-015762

(51) Int. Cl.$^7$ .............................................. G06F 19/00
(52) U.S. Cl. ....................... 700/245; 700/253; 700/257; 700/262; 700/275; 700/246; 700/247; 700/248; 700/249; 700/250; 318/800; 318/805; 701/23; 901/1; 901/46; 901/47
(58) Field of Search ................................. 700/253, 245, 700/246, 247, 248, 249, 250, 257, 762, 275, 302, 112; 704/9, 1, 10; 701/23; 901/1, 46, 47; 318/800, 805; 29/38.9, 563; 348/94

(56) References Cited

U.S. PATENT DOCUMENTS

| | | | | |
|---|---|---|---|---|
| 3,911,613 A | * | 10/1975 | Morison et al. ............... 44/338 |
| 5,100,362 A | * | 3/1992 | Fogarty et al. ............. 446/272 |
| 5,172,806 A | * | 12/1992 | Mickelberg ................. 206/756 |
| 5,289,916 A | * | 3/1994 | Mickelberg .................... 84/661 |
| 5,606,494 A | * | 2/1997 | Oshima et al. ............. 323/280 |
| 5,626,505 A | * | 5/1997 | Cheng ........................ 446/278 |
| 5,870,527 A | | 2/1999 | Fujikawa et al. ........... 700/245 |

FOREIGN PATENT DOCUMENTS

| | | |
|---|---|---|
| EP | 0 762 498 A2 | 3/1997 |
| JP | 61-167997 | 7/1986 |
| JP | 6-12401 | 1/1994 |
| JP | 9-114514 | 5/1997 |
| JP | 9-153082 | 6/1997 |
| JP | 10-289006 | 10/1998 |

OTHER PUBLICATIONS

Masahiro Fujita, et al., "ROBOT Entertainment", Proceedings of the 6$^{th}$ Sony Research Forum, Nov. 27, 1996, p. 234–239.

(List continued on next page.)

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer

(57) ABSTRACT

In a robot device, its functions and performance can be improved with ease. According to the present invention, control device detachably mounted on a prescribed component unit for driving and controlling each of the component units in a prescribed state is provided and thereby, the control device can be easily exchanged for a new one. Thus the robot device in which its functions and performance can be improved can be realized. Further, according to the present invention, a robot device comprises storing device detachably mounted on the prescribed component unit for storing desired behavior type information and thereby, the storing device can be readily exchanged for storing device storing behavior type information different from the behavior type information stored in the former storing device. Thus, the robot device in which its functions and performance can be improved with ease can be realized.

18 Claims, 8 Drawing Sheets

OTHER PUBLICATIONS

Masahiro Fujita, et al., "Reconfigurable Physical Agents", Proceedings of the Second International Conference on Autonomous Agents, May 9, 1998, p. 54–61.
Heiserman, K–9 Robot, 1979, Internet, p. 1.*
Sony, Robot–Pet Aibo, Jun. 1, 1999, Internet.*
Agah et al., Architectural and Functional Specifications for a Robot Kitten "Robokoneko" to be Controlled by a 10,000 Evolved Neural Net Module Artificial Brain, 1993–2001, Internet.*

Veryba et al., Method and System for robot end effector path correction using 3–D ultrasound sensors, 2000, pp.(s): 1240–1243 vol. 2.*

* cited by examiner

ROBOT APPARATUS

TECHNICAL FIELD

The present invention relates to a robot apparatus which is suitable for application to, for example, an entertainment robot for family use.

BACKGROUND ART

In recent years, entertainment robots have been developed for use as hobby or entertainment at home. Entertainment robots of this kind have shapes, for example, well resembling to quadruped animals such as a dog, a cat or the like which are raised at home, and are equipped with a visual sensor, a tentacle sensor and so on in addition to a microprocessor and a signal processing circuit such that they autonomously act based on a predetermined control program.

An entertainment robot configured as mentioned above stores basic operation programs out of control programs and data such as emotion models and so on in an internal memory disposed within a body to act based on these operation programs and emotion models. With this configuration, if the user wants the entertainment robot to perform an action desired by the user, the user cannot but disassemble the entertainment robot to exchange the internal memory or rewrite data in the internal memory, which however is difficult for ordinary users.

DISCLOSURE OF THE INVENTION

The present invention has been made in view of the foregoing problem, and is intended to propose a robot apparatus which can remarkably improve the usability.

To solve the problems, in the present invention, a robot apparatus which actuates a movable portion based on a predetermined control program to autonomously perform actions, comprises fixed storage means fixed at a predetermined position in the robot apparatus, removable storage means removably disposed at a predetermined position of the robot, and control means for storing control data used to operate the control program in the fixed storage means or in the removable storage means in accordance with the type of the control data or for reading control data from the fixed storage means or from the removable storage means in accordance with the type of the control data.

Thus, when the control data used to operate a control program is stored in the fixed storage means or the removable storage means, or when control data is read from the fixed storage means or the removable storage means, the robot apparatus can appropriately use the fixed storage means or the removable storage means in accordance with the type of the control data, and can remove the removable storage means to readily add, delete and rewrite data contents, thereby making it possible to remarkably improve the usability.

Further, in the present invention, a robot apparatus which actuates a movable portion based on a predetermined control program to autonomously perform actions, comprises storage means disposed at a predetermined position of the robot apparatus, and control means for storing control data used to execute the control program in the storage means in accordance with the type of the control data, and for reading the control data from the storage means in accordance with the type of the control data, wherein the storage means stores a change in internal states caused by the control means when the movable portion is actuated.

Thus, since the robot apparatus stores in the storage means changes in internal states caused by control means when a movable portion is actuated, such changes in internal states can be subsequently retrieved for confirmation, thereby making it possible to remarkably improve the usability.

BEST MODE FOR CARRYING OUT THE INVENTION

One embodiment of the present invention will hereinafter be described in detail with reference to the accompanying drawings.

(1) Appearance of Entertainment Robot

Figure 1:
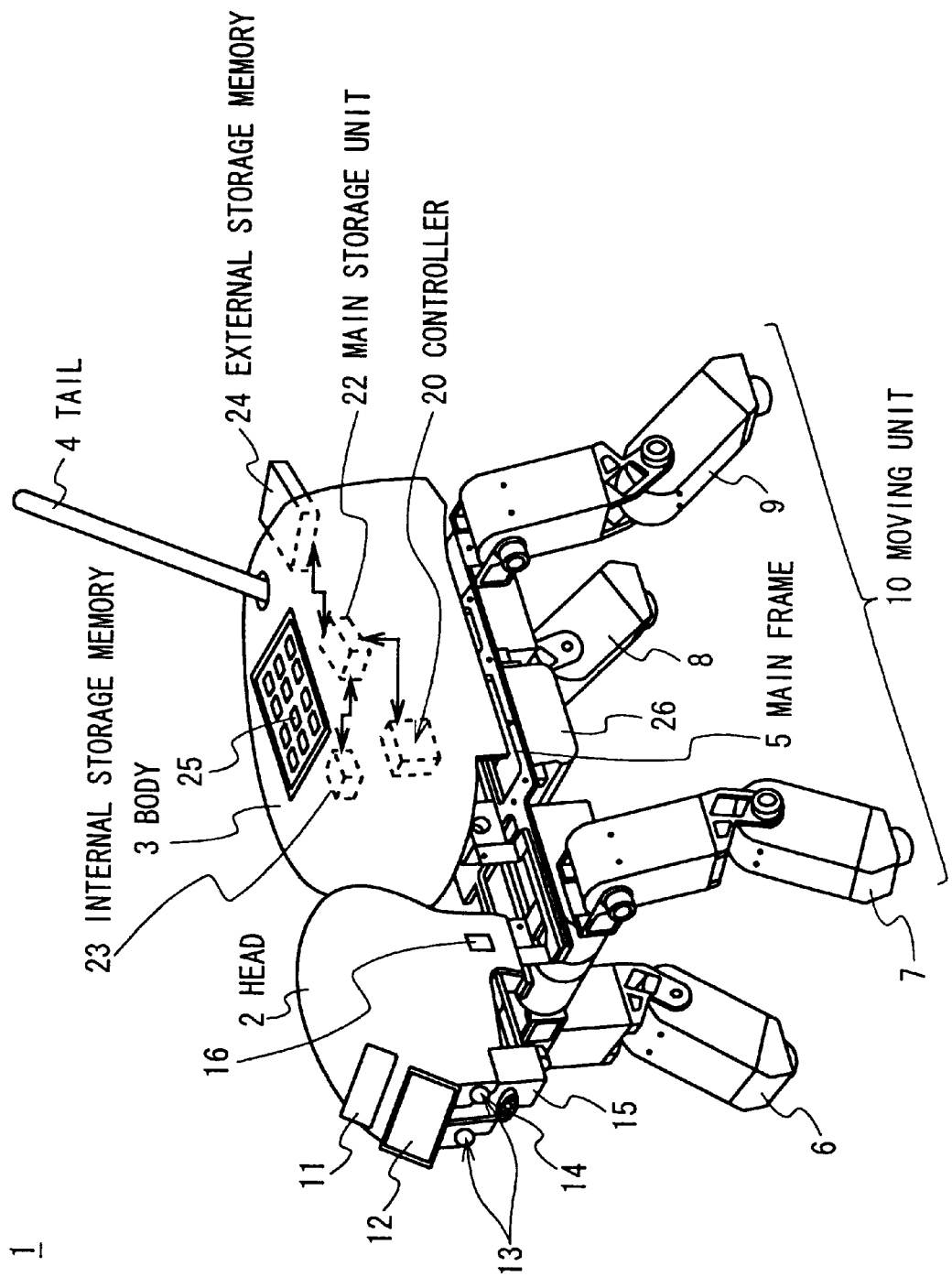
FIG. 1 is a schematic perspective diagram illustrating the appearance of an entertainment robot according to the present invention.

In FIG. 1, an entertainment robot (hereinafter simply referred to as the "robot") embodying a robot apparatus according to the present invention, generally designated by the reference numeral 1, is composed of a head 2; a body 3; a tail 4; and a moving unit 10 including a main frame 5 and a front right leg 6, a front left leg 7, a rear right leg 8 and a rear left leg 9 mounted to the main frame 5. Here, the moving unit 10 supports the head 2 and the body 3 by the main frame 5, wherein the body 3 is mounted thereon with the tail 4 extending from a portion of the body 3.

The head 2 has a touch sensor 11; an image display unit 12 including a liquid crystal display; a camera unit 13 including a CCD (Charge Coupled Device); a speaker 14 as audio output means; an infrared remote controller 15; and a microphone 16. The body 3 contains a controller 20 as a control means based on a CPU (Central Processing Unit); a main storage unit 22 implemented by RAM (Random Access Memory) devices; and an internal storage memory 23 as fixed storage means implemented by non-volatile flash memories mounted and fixed at a predetermined position. The body 3 also has an input key unit 25 disposed on the back and including a plurality of input keys; and an external storage memory 24 as removable storage means disposed at a rear portion and implemented by a removal memory card.

The moving unit 10 is equipped with a battery 26 in an abdominal region of the main frame 5, where the battery 26 is charged by a dedicated charger (not shown).

(2) Circuit Configuration of Entertainment Robot

Figure 2:
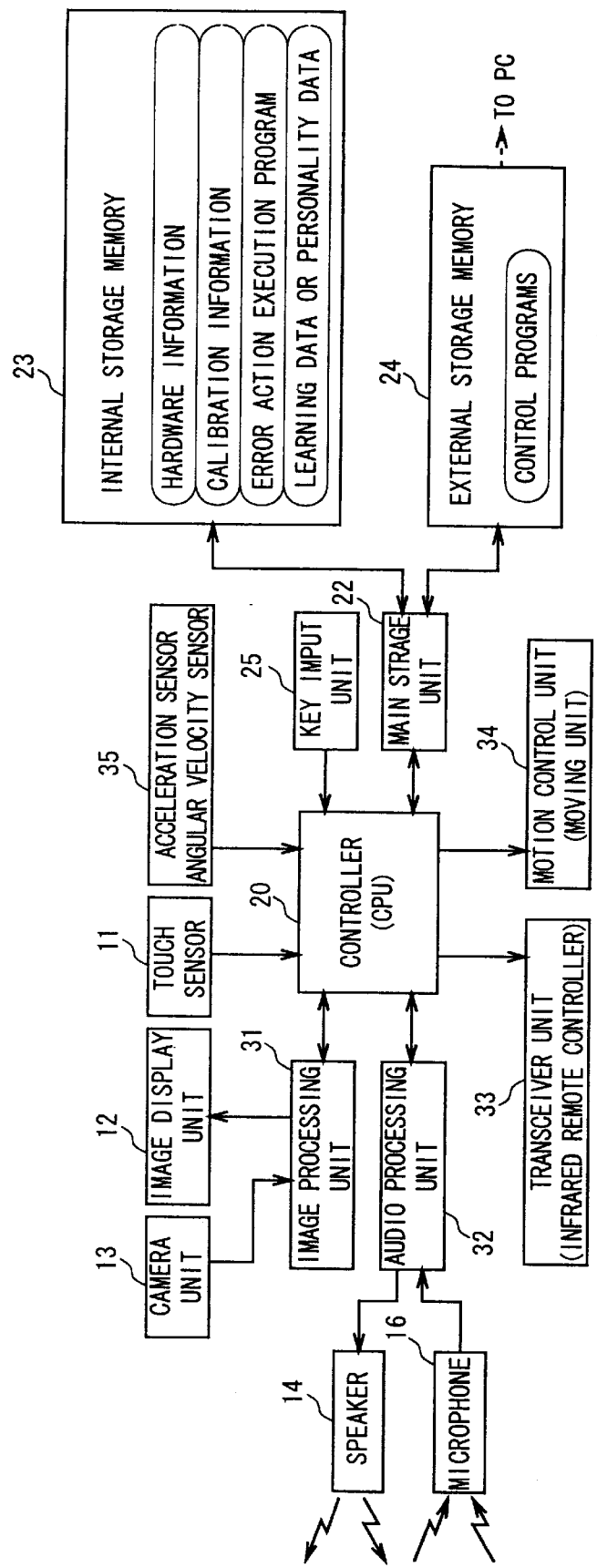
FIG. 2 is a block diagram illustrating the circuit configuration of the entertainment robot.

Next, a circuit configuration of the robot 1 will be described with reference to FIG. 2. The robot 1 is designed to control the general operation by the controller 20. An image signal imaged by the camera unit 13 is subjected to predetermined image processing by an image processing unit 31, and is sent to the controller 20 as image data.

The image processing unit 31 performs predetermined image processing on reproduced data read by the controller 20 from the internal storage memory 23 or the external storage memory 24 through the main storage unit 22, and displays this on the image display unit 12 as a reproduced image.

The robot 1 performs predetermined audio processing on an audio signal collected by the microphone 16 by an audio processing unit 32, and sends this to the controller 20 as audio data. The audio processing unit 32 also performs predetermined audio processing on reproduced data read by the controller 20 from the internal storage memory 23 or the external storage memory 24 through the main storage unit 22, and outputs this as a reproduced audio from the speaker 14, for example, a "cry" or the like.

A transceiver unit 33 of the robot 1 wirelessly transmit control signals to external devices (not shown) based on instructions from the controller 20 through infrared light. Motion control units 34 are composed of motors, drivers and position sensors for controlling movements of joints, and are built in the head 2, the front right leg 6, the front left leg 7, the rear right leg 8 and the rear left leg 9, respectively. Thus, the controller 20 controls the respective motion control units 34 in the head 2, the front right leg 6, the front left leg 7, the rear right leg 8 and the rear left leg 9 to move them as it instructs, and detects positions when it moves them.

Further, the robot 1 has a touch sensor 11 which detects touch information indicating whether or not a manipulation button is depressed on a predetermined device as well as detects touch information indicating whether or not the robot 1 is stroked or tapped by the user from a touch time and an impact given thereto when the robot 1 is touched, and has an acceleration sensor and an angular velocity sensor 35 which detect an acceleration and an angular velocity from which the posture in a movement and its current position are recognized.

While the robot 1 is designed to generally act in an autonomous way, predetermined optional instructions may be sent to the controller 20 by predetermined key entries through a keyboard on the key input unit 25, thereby allowing the user to have the robot 1 perform desired actions.

Figure 3:
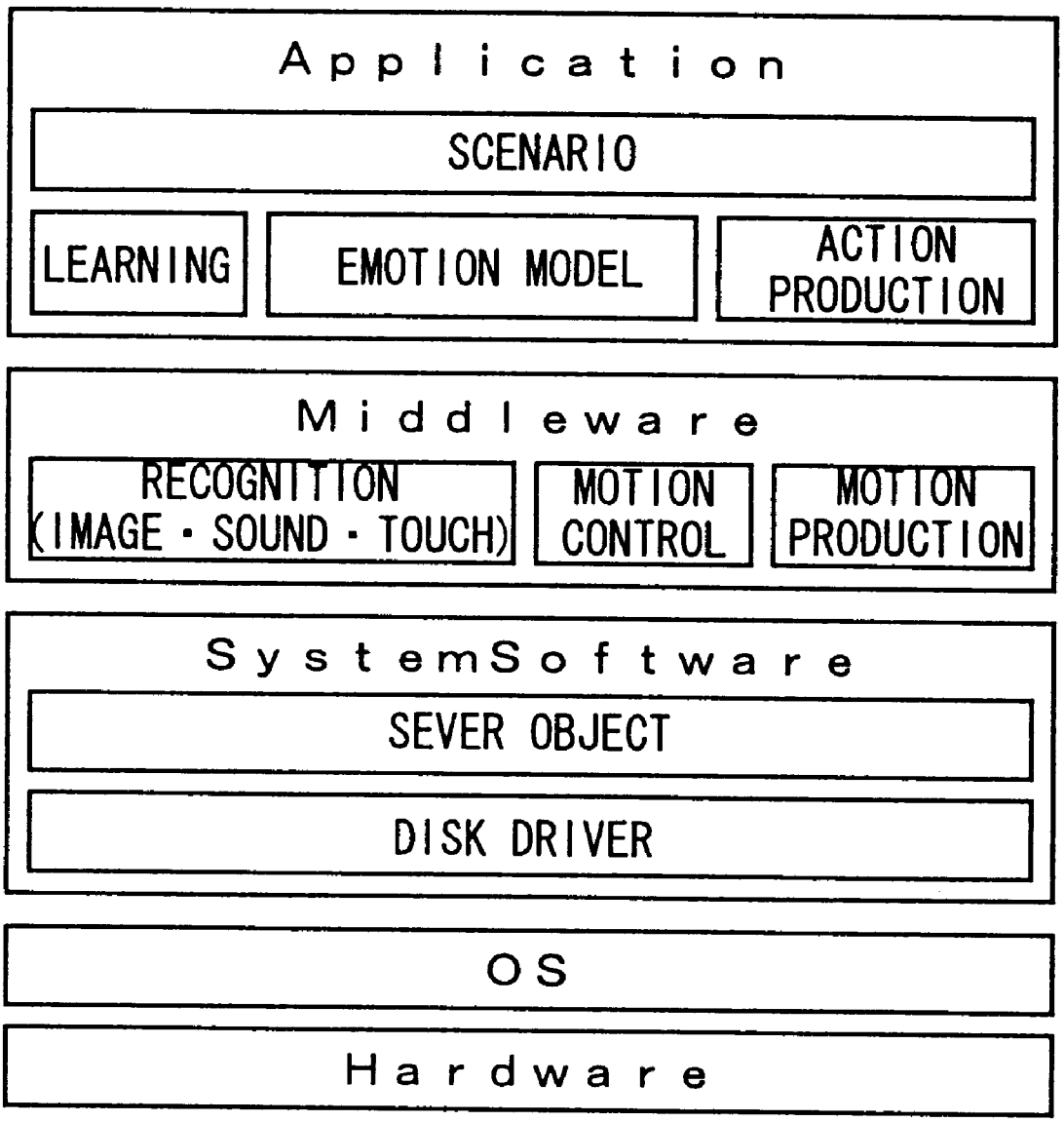
FIG. 3 is a schematic diagram illustrating the configuration of a control program.

The external storage memory 24 stores in hierarchy several control programs for controlling general motions and emotions of the robot 1, as illustrated in FIG. 3, where three layers consisting of a system software layer, a middleware layer and an application layer are formed on a built-in real time OS (Operating System) which is run by the hardware of the robot 1 configured as described above.

The system software layer is composed, for example, of a device driver for directly controlling the respective devices such as the head 2, the front right leg 6, the front left leg 7, the rear right leg 8 and the rear left leg 9; and a server object for providing services to objects on upper layers.

The middleware layer is composed, for example, of a recognition object for processing image signals, audio signals, touch information and so on; a motion control object for controlling motions of the robot 1 such as walking, posture and so on; and an action production object for expressing emotions by moving the leg(s), the head 2 and the tail 4.

The application layer is composed, for example, of a learning object for learning; an emotion model object for handling emotions; a behavior production object for determining behavior; and a scenario object for characterizing the entire robot 1.

Here, the emotion model object comprises an emotion module. The emotion module is designed to handle a plurality of emotion units, referred to as six affection models (pleasure, sadness, anger, fear, surprise, disgust), as data. The emotion units have, for example, a current emotion level (hereinafter referred to as the "emotion level"); a minimum emotion level; a maximum emotion level; and a threshold value as a reference for notifying an emotion.

Each of these emotion levels are initially initialized by the values of emotion parameters, and subsequently varies in accordance with information from the outside such as the recognition object, and over time. Each of the emotion units also provides the nature mutually affecting one another such that they mutually increase or decrease their emotion levels. For example, if the sadness emotion unit has a high emotion level, the anger emotion unit has an increased emotion level. Also, when the pleasure emotion level has a high emotion level, the anger and disgust emotion units have lower emotion levels.

Figure 4:
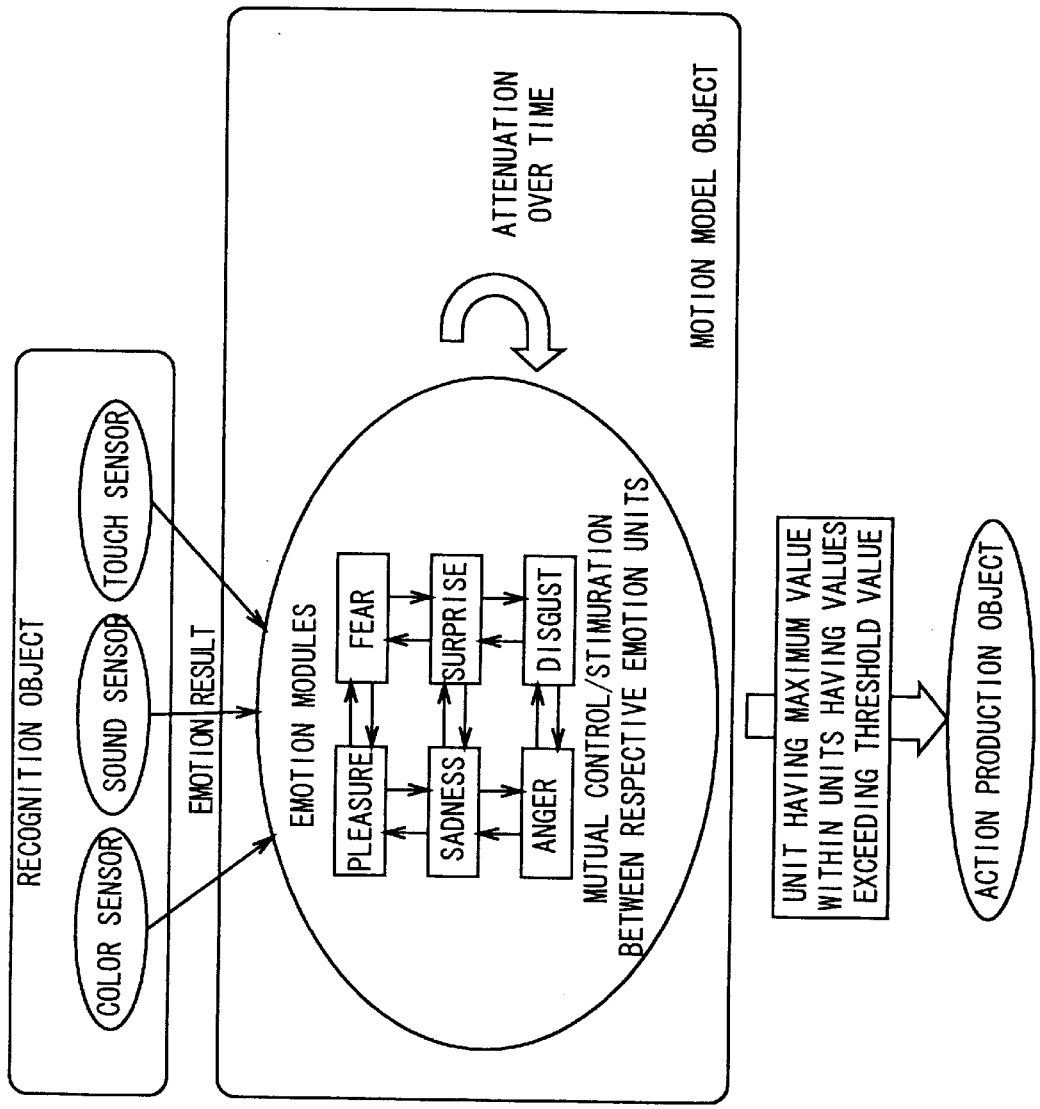
FIG. 4 is a schematic diagram used for explaining the relationship between emotion modules and other objects.

Also, as illustrated in FIG. 4, the recognition object in the middleware layer handles input information, for example, image color information captured by a color sensor; an audio signal collected by the microphone 16; touch information captured by the touch sensor 11; and so on, as a variety of sensor information captured from the respective devices including the head 2, the front right leg 6, the front left leg 7, the rear right leg 8, the rear left leg 9 and so on, and notifies the emotion module of the emotion model object of the input information as a recognition result.

The emotion module, upon receiving the recognition result from the recognition object, determines the type of the inputted recognition result, and varies the emotion level of each emotion unit using parameters associated with the type. Then, the emotion module selects an emotion unit having a maximum emotion level from among those emotion units which exceed threshold values.

The selected emotion unit notifies its information to an object which requests the output, for example, the behavior production object or the like. The object requesting the output must be registered itself as an observer in the emotion module by an object-oriented observer pattern.

The behavior production object controls the hardware through the action production object and so on. Stated another way, the robot 1 is designed to express the emotion by moving the respective devices, the head 2, the front right leg 6, the front left leg 7, the rear right leg 8, the rear left leg 9, and so on.

(3) Difference in Usage between Internal Storage Memory and External Storage Memory in Entertainment Robot As mentioned above, the robot 1 is provided with the internal storage memory 23 as a fixed storage means mounted inside the body 3 so as not to be removed therefrom, and the external storage memory 24 as a removable storage means removably mounted to the rear portion of the body 3, such that the internal storage memory 23 and the external storage memory 24 are individually used as appropriate in accordance with the type of data and applications based on the control of the controller 20 as control means.

(3-1) Storage Location for Information Related to Hardware

In the robot 1, for example, the product name, version number, serial number, product type information, history of repairs and modifications, and so on of the robot 1 are information related to the hardware inherently possessed by the robot 1 itself, so that such information is stored in the internal storage memory 23.

In this case, when the manufacturer receives a request for repair, the information related to the hardware is read from the internal storage memory 23 of the robot 1 to know the manufacture type, produced date, and past repair situations. When the repair is completed, the history of the repair is additionally written into the internal storage memory 23 in a similar manner. In this event, since the information related to the hardware is stored in the internal storage memory 23 mounted inside the body 3, the information is prevented from being modified freely by the user.

Moreover, the product type information is read out from the internal storage memory 23 of the robot 1 so that software responds to the subtle noise of a motor or the like of hardware to allow operations in different parameters depending on the product type.

(3-2) Storage Location for Calibration Information

Also, in the robot 1, the motion control unit 34 detects a reference angle position by a position sensor when each of the devices, the head 2, the front right leg 6, the front left leg 7, the right rear leg 8, the rear left leg 9 and so on is moved over a predetermined angular distance, to calibrate an angle offset based on this angle position, and calibrates misrecognition of a color with reference to a range of RGB value or UV value corresponding to the color represented by an image signal imaged by the camera unit 13 for allowing the robot 1 to accurately recognize the color. Such angle information and the range of the UV value, serving as references, are stored in the internal storage memory 23 as calibration information. Apart from that, configuration information or the like of the acceleration sensor 35 can be also stored in the internal storage memory 23.

In this case, a U-value is represented by $\alpha$ (R (Red)—Y (luminance signal)), while a V-value is represented by $\beta$ (B(Blue)—Y (luminance signal)), where $\alpha$ and $\beta$ used herein are coefficients. The calibration information is such information that serves as the reference used to calibrate an offset, if it occurs while robot 1 is being used, and is stored in the internal storage memory 23 such that it is protected from being modified freely by the user.

(3-3) Storage Location for Error Action Execution Program

Further, since the robot 1 has the control program stored in the external storage memory 24 (FIG. 2) for performing basic operations, the robot 1 does not become active unless the external storage memory 24 is mounted to the rear portion of the body 3. In addition, even with the external storage memory 24 mounted to the rear portion of the body 3, it does not operate if any error has occurred.

In this event, when the external storage memory 24 is not mounted or when an error has occurred even with the external storage memory 24 mounted in place, the robot 1 has the user recognize that it cannot autonomously operate through a predetermined action. Such an error action execution program for notifying the user of an error through such an action has been previously stored in the internal storage memory 23 (FIG. 2).

If the error action execution program were stored in the external storage memory 24, a failure in mounting the external storage memory 24 to the rear portion of the body 3 would result in disabling the robot 1 not only to become active but also to perform an action to notify the user of an error.

In this case, however, the robot 1 has the error action execution program for the action for notifying an error previously stored in the internal storage memory 23, so that the robot 1 can minimally take the action for notifying an error, even if it cannot be active due to the absence of the external storage memory 24, thus permitting the user to readily recognize the error.

(3-4) Storage Locations for Learning Data and Personality Data

The robot 1 further has a plurality of parameters in the action production object for defining predetermined actions autonomously performed in response to an external input, for example, "when the user strokes the head 2, the robot 1 wags the tail 4," "when the user taps the head 2, the robot 1 shakes the head while raising and lowering the head 2," and so on. The internal storage memory 23 stores learning data on parameters associated with a predetermined action which has become to be performed more frequently by learning, within the foregoing parameters, and personality data on parameters which express the characteristics and natures, which differ from one robot 1 to another, such as a robot 1 which inherently "moves the head 2 frequently," a robot 1 which "usually wags the tail," and so on.

In this case, the robot 1 stores the learning data and the personality data in the internal storage memory 23, so that even if the external storage memory 24, which stores the control program, is exchanged with another one, the learning data already acquired through learning and inherent personality data possessed by the particular robot 1 will not be modified, thus eliminating the need for repeated learning or a change in personality.

(3-5) Storage Location for Environmental Information

Also, in the robot 1, image signals of the surroundings, captured by the camera unit 13 (FIG. 1) every predetermined time period, are graphically processed by the image processing unit 31 (FIG. 2), and are sent to the external storage memory 24 through the main storage unit 22 as an image data file for storage in the external storage memory 24. Further, in the robot 1, audio signals of the surroundings collected by the microphone 16 (FIG. 1) every predetermined time period are audibly processed by the audio processing unit 32 (FIG. 2), and sent to the external storage memory 24 through the main storage unit 22 as an audio data file for storage in the external storage memory 24.

Figure 5:
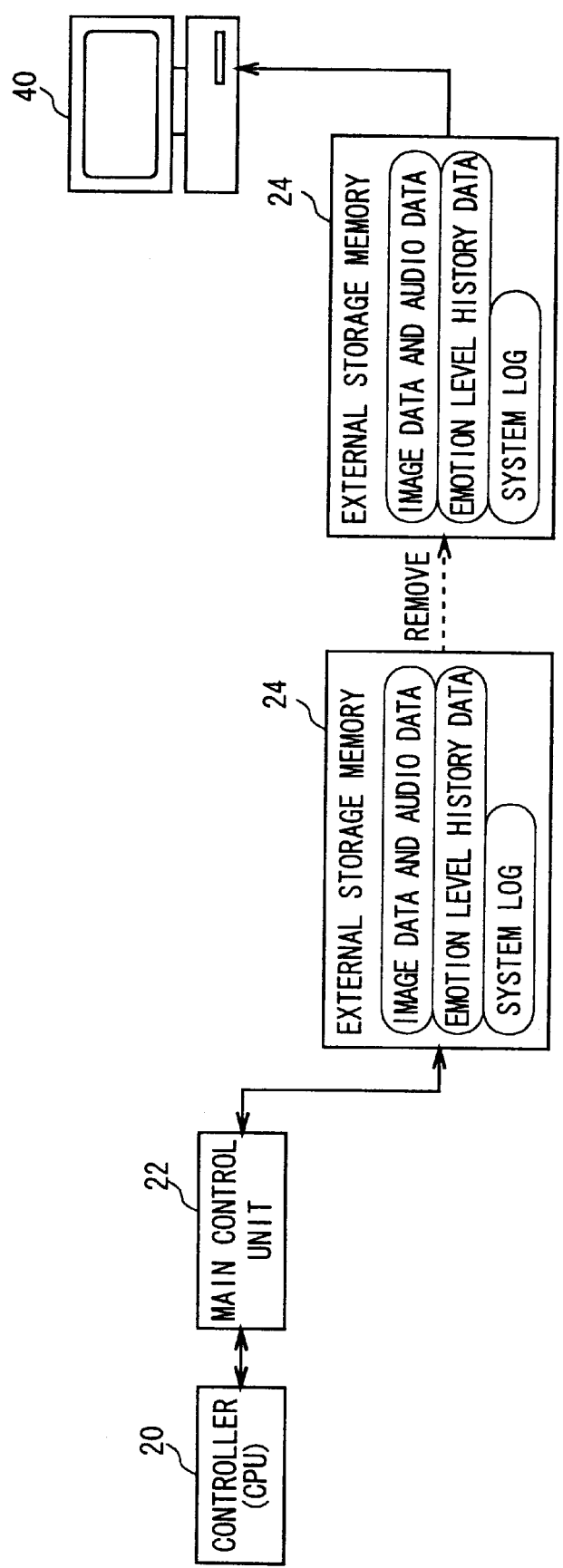
FIG. 5 is a schematic diagram used for explaining data (1) to be written in an external storage memory.

In this event, the user removes the external storage memory 24 from the rear portion of the robot 1, as illustrated in FIG. 5, and reads the image data file and the audio data file stored in the external storage memory 24 through a personal computer (hereinafter simply referred to as the "computer") 40 such that they can be outputted to a monitor.

In this way, the user can confirm a view seen by the robot 1, displayed on the monitor, as well as can confirm a voice heard by the robot 1, outputted from a speaker of the monitor, so that user can identify environmental information on the surroundings of the robot 1 and know the action history of the robot 1.

(3-6) Storage Location for Emotion Level History Data

The robot 1 further varies the emotion levels of the emotion units when it sees a preferred color or when it is stroked by someone during its autonomous action. The history of variations in the emotion levels is stored in the external storage memory 24 as emotion level history data. In addition, the history of actions performed by the robot 1 itself is also stored in the external storage memory 24 as action history data.

In this event, the user removes the external storage memory 24 from the rear portion of the robot 1, as illustrated in FIG. 5, and reads the emotion level history data and the action history data stored in the external storage memory 24 through the computer 40 such that they can be outputted to the monitor. In this way, the user can confirm the history of emotion levels and the history of actions of the robot 1, displayed on the monitor, so that user can know a change in emotion and a change in action of the robot 1.

(3-7) Storage Location for System Log

If any error occurs upon powering on or during an autonomous action, the robot 1 stores such error in the external storage memory 24 as a system log. In this event, the user can remove the external storage memory 24 from the rear portion of the robot 1, as illustrated in FIG. 5, and reads the system log stored in the external storage memory 24 through the computer 40 to display it on the monitor.

In this way, the user can confirm the system log of the robot 1 displayed on the monitor, and consequently know the situation of an error which has occurred in the robot 1.

(3-8) Storage Location for Recognition Image Data

The robot 1 further stores a template image representative of the face of the user previously in the external storage memory 24. In this event, the robot 1, when imaging the user by the camera unit 13, matches the captured still image with the template image previously stored in the external storage memory 24 to determine whether or not the user is his master.

Figure 6:
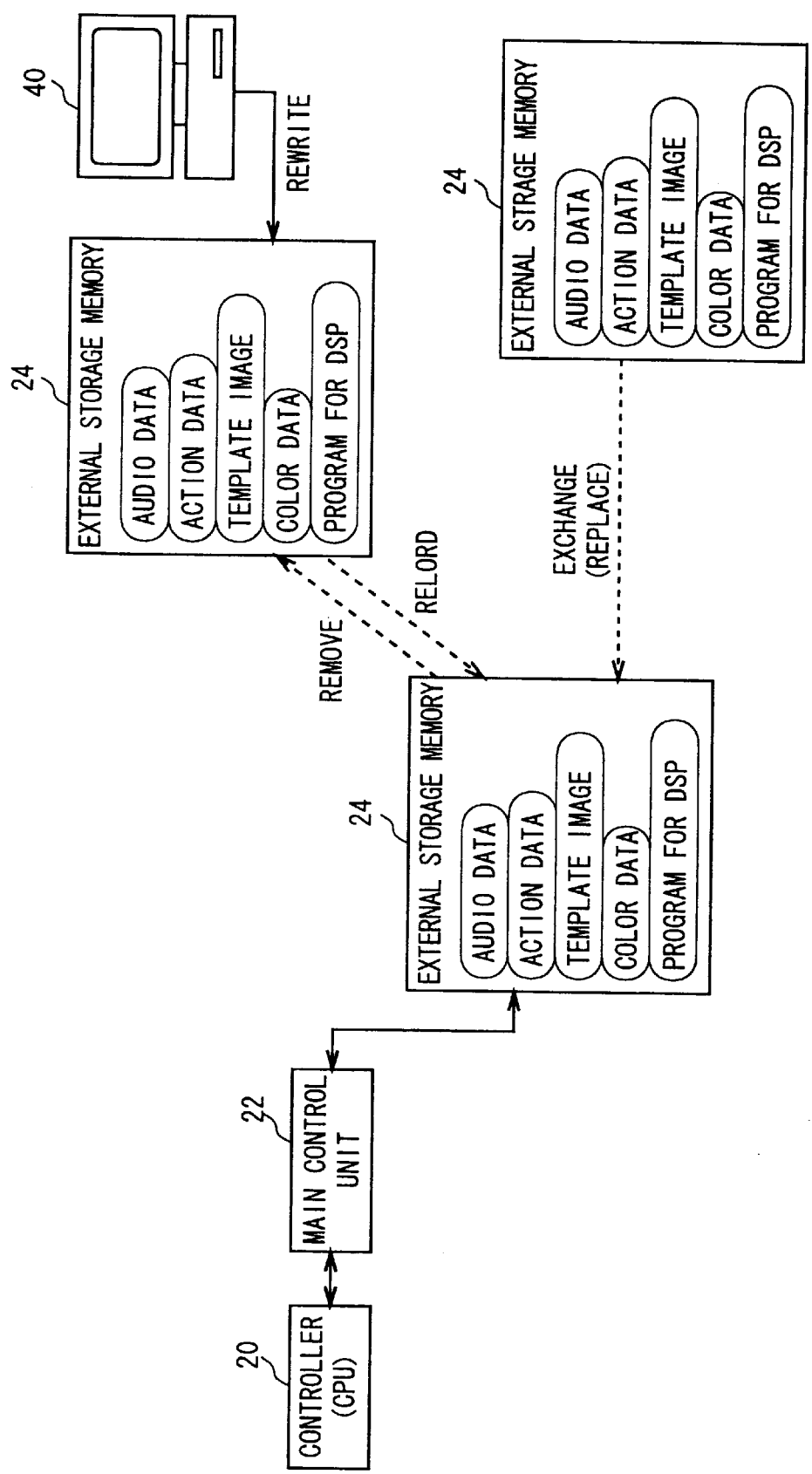
FIG. 6 is a schematic diagram used for explaining data (2) to be written in the external storage memory.

In this way, the robot 1 previously stores the template image as recognition image data in the external storage memory 24. As illustrated in FIG. 6, the external storage memory 24 can be removed from the rear portion of the robot 1 to rewrite the template image stored in the external storage memory 24 with another template image representative of the face of another user through the computer 40.

When the robot 1 is reloaded with the external storage memory 24 which stores the new template image representative of the face of the other user, and when the robot 1 is loaded with aa different external storage memory 24 which stores a new template image, the robot 1 can perform the template matching based on the new template image, so that the robot 1 can recognize that the other user is a new master.

In this way, the robot 1 previously stores an image to be recognized in the external storage memory 24. For changing the image to be recognized, the external storage memory 24 may be removed to rewrite data therein or may simply exchange with another one.

(3-9) Storage Location for Recognized Color Data

The robot 1 further stores a range of the RGB values and UV values associated with the type of a color to be recognized within an image signal imaged by the camera 13 in the external storage memory 24 as color data. In this case, the robot 1 may be provided with a control program having instructions which, for example, cause the robot 1 to "run after" if it recognizes a "red" color, or with a control program having instructions which cause the robot 1 to "run away" if it recognizes a "black" color, thereby making it possible to set action patterns of the robot 1 in accordance with colors.

In this way, the robot 1 previously stores color data as recognized color data in the external storage memory 24, so that the external storage memory 24 may be removed from the rear portion of the robot 1, as illustrated in FIG. 6, to rewrite the color data stored in the external storage memory 24 to other color data through the computer 40.

When the robot 1 is reloaded with the external storage memory 24 which has been rewritten with other color data, and when the robot 1 is loaded with a different external storage memory 24 which stores other color data, the robot 1 results in taking an action pattern corresponding to the other rewritten color. It is therefore possible to have the robot 1 recognize a color desired by the user and to set in the robot 1 an action pattern corresponding to the recognized color.

(3-10) Storage Location for Audio Data

The robot 1 further stores audio data corresponding to audio output from the speaker 14 in the external storage memory 24. As audio data stored in the external storage memory 24, for example, cries of actual animals may be digitally recorded and used as a sound file. Alternatively, musical instrument data conforming to the standard referred to as MIDI (Musical Instrument Digital Interface), may be used.

In this case, since the robot 1 is designed to store audio data in the external storage memory 24, the external storage memory 24 may be removed from the rear portion of the robot 1, as illustrated in FIG. 6, to rewrite audio data stored in the external storage memory 24 through the computer 40.

When the robot 1 is reloaded with the external storage memory 24 which has been thus rewritten with other audio data, and when the robot is loaded with a different external storage memory 24 which stores other audio data, the robot 1 can output a cry from the speaker 14 in accordance with the other rewritten audio data. By thus storing audio data in the external storage memory 24, the user can freely set a desired cry in the robot 1.

(3-11) Storage Location for Action Data

The robot 1 is further designed to perform an action of "shaking the head" and an action of "wagging the tail" based on action data corresponding to predetermined action patterns. The external storage memory 24 stores action data corresponding to respective ones of such action patterns.

In this case, since the robot 1 is designed to store action data in the external storage memory 24, the external storage memory 24 may be removed from the rear portion of the robot 1, as illustrated in FIG. 6, to rewrite action data stored in the external storage memory 24 to new action data through the computer 40.

When the robot 1 is reloaded with the external storage memory 24 which has been thus rewritten with new action data, and when the robot is loaded with a different external storage memory 24 which stores new action data, the robot 1 can perform an action in accordance with the new action data. By thus storing action data in the external storage memory 24, the user can readily have the robot 1 perform a desired action.

(3-12) Storage Location for Operation Program

The robot 1 further stores an operation program for operating the image processing unit 31 in the external storage memory 24 when the image processing unit 31 is based on a programmable DSP (Digital Signal Processor).

In this case, since the robot 1 is designed to store the operation program in the external storage memory 24, the external storage memory 24 may be removed from the rear portion of the robot 1, as illustrated in FIG. 6, to rewrite the operation program stored in the external storage memory 24 to a new operation program through the computer 40.

When the robot 1 is reloaded with the external storage memory 24 which has been thus rewritten with a new operation program, and when the robot is loaded with a different external storage memory 24 which stores a new operation program, the robot 1 can have the image processing unit 31 execute processing other than the image processing in accordance with the new operation program.

By thus storing the operation program in the external storage memory 24, the processing executed by the DSP can be arbitrarily set by exchanging the external storage memory 24 or by rewriting the operation program in the external storage memory 24.

(3-13) Storage Location for Learning Data

The robot 1 further stores, in the external storage memory 24, external data associated with those parameters of the operation defining parameters for a predetermined operation which has come to be more frequently executed. Here, the learning data refers to such data that is set to have a higher probability of performing a predetermined operation when a predetermined external input is applied. For example, if the user strokes the robot 1 when it performs a certain action, the robot 1 subsequently performs the action more frequently (by touch information inputted when the robot 1 is stroked).

Figure 7:
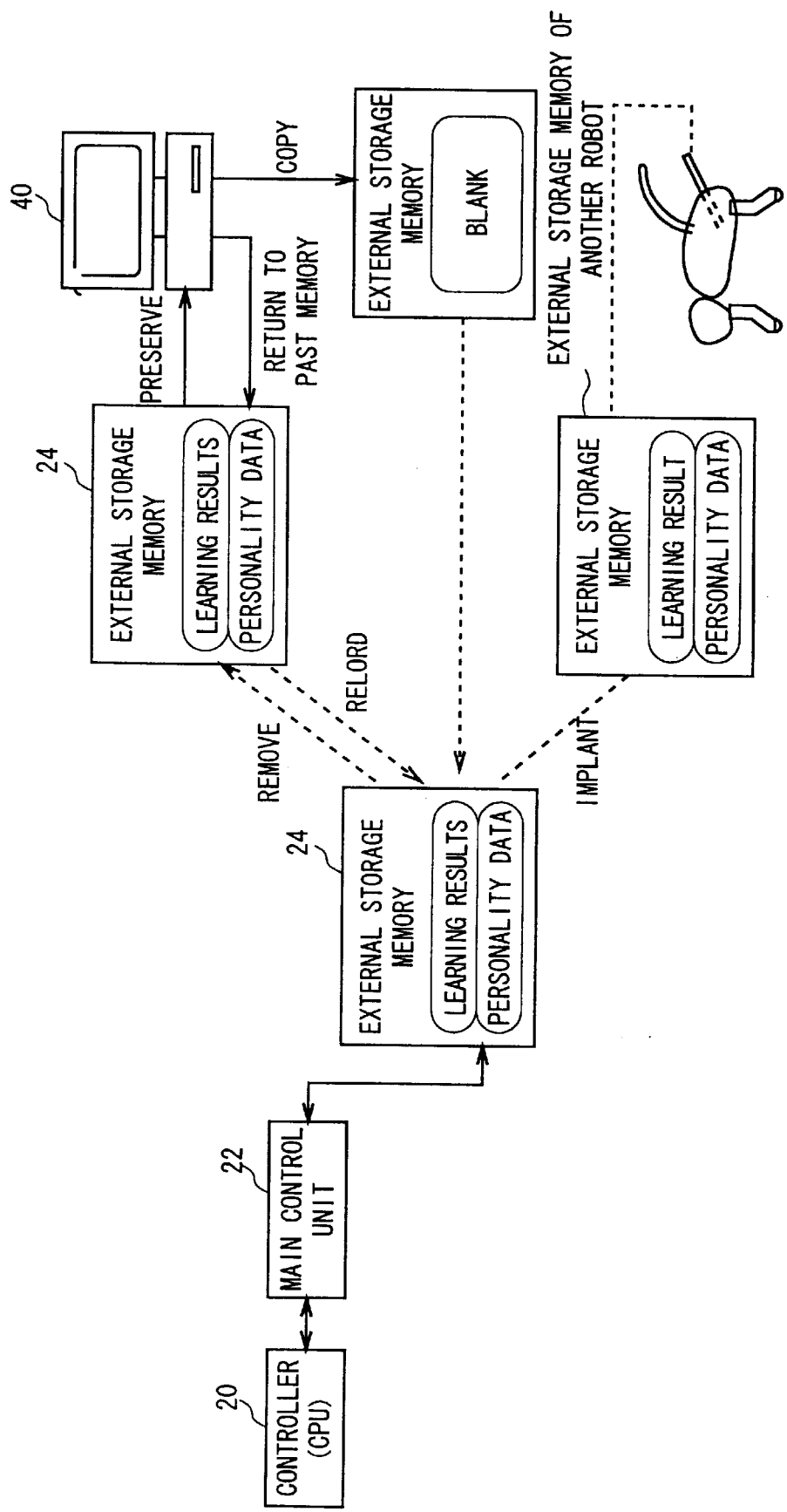
FIG. 7 is a schematic diagram used for explaining data (3) to be written in the external storage memory.

In this case, since the robot 1 is designed to store the learning data in the external storage memory 24, the external storage memory 24 may be removed from the rear portion of the robot 1, as illustrated in FIG. 7, to rewrite the learning data stored in the external storage memory 24 to new learning data through the computer 40, to copy other learning data, to return to data prior to learning, or to implant learning data of another robot.

When the robot 1 is reloaded with the external storage memory 24 which has been thus rewritten with new learning data, and when the robot is loaded with a different external storage memory 24 which stores new learning data, the robot 1 can immediately perform an action in accordance with the new learning data without forcing the robot 1 to learn again.

(3-14) Storage Location for Personality Data

The robot 1 has data common to all robots, and further stores personality data, which provides each robot with different action patterns and characteristics, in the external storage memory 24.

In this case, since the robot 1 is designed to store the personality data in the external storage memory 24, the external storage memory 24 may be removed from the rear portion of the robot 1, as illustrated in FIG. 7, to rewrite the personality data stored in the external storage memory 24 to new personality data through the computer 40, to copy other personality data, or to implant personality data of another robot.

When the robot 1 is reloaded with the external storage memory 24 which has been thus rewritten with new personality data, and when the robot is loaded with a different external storage memory 24 which stores new personality data, the robot 1 can immediately perform an action in accordance with the new personality data.

(4) Data Processing Procedure of Controller 20

Figure 8:
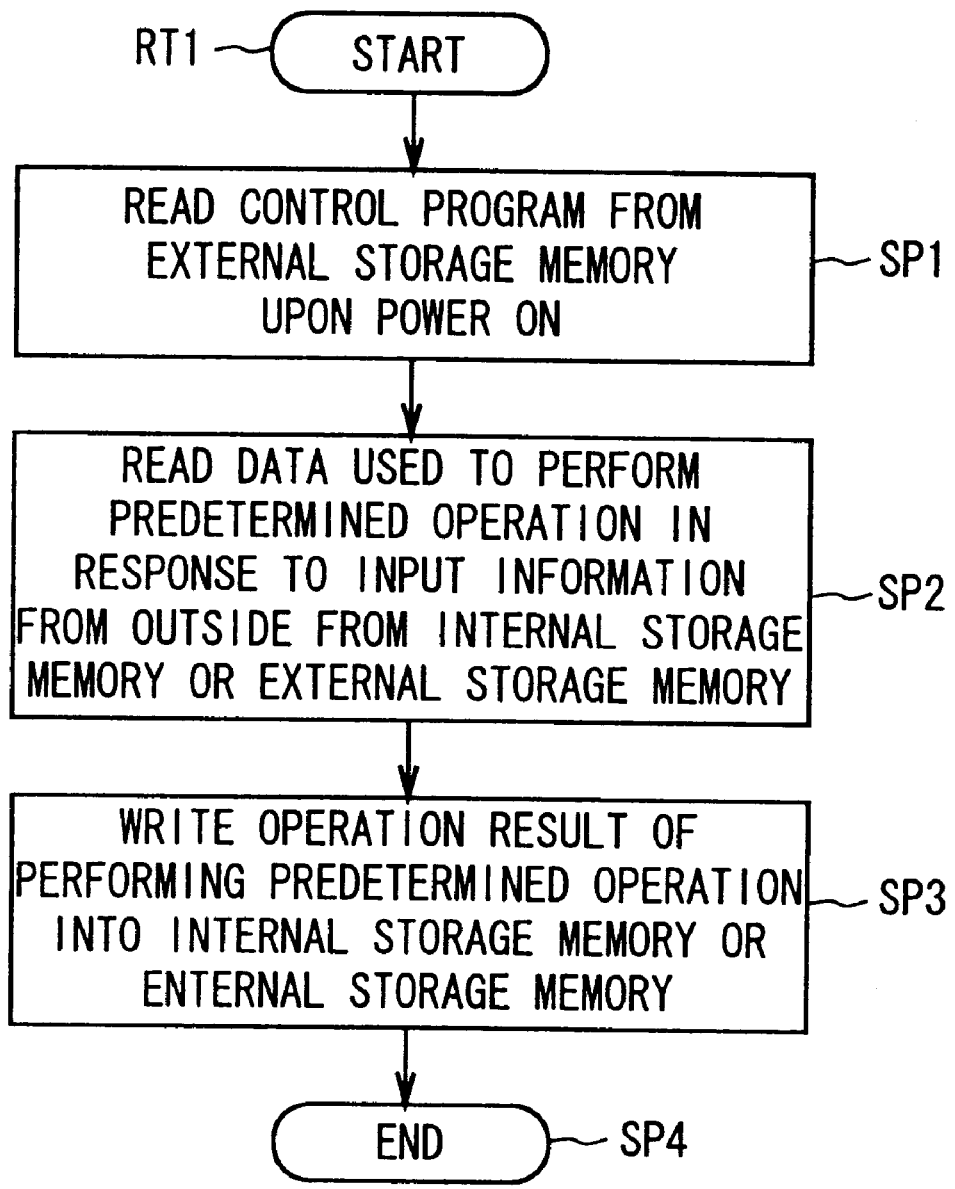
FIG. 8 is a flow chart illustrating a procedure for writing data into an internal storage memory or the external storage memory.

Next described with reference to a processing procedure for writing data RT1 shown in FIG. 8 will be data processing until operation result data such as the learning data, image data file, audio data file, emotion level history data, operation history data, system log and so on resulting from autonomous operations of the robot 1 are stored either in the internal storage memory 23 or in the external storage memory 24.

The controller 20 of the robot 1 enters a starting step of processing procedure for writing data RT1, and proceeds to step SP1. At step SP1, the controller 20 reads the control program from the external storage memory 24 through the main storage unit 22 and starts the program each time the robot 1 is powered on, and proceeds to the next step SP2.

At step SP2, the controller 20 read data used to perform a predetermined operation in accordance with an external input from the internal storage memory 23 or the external storage memory 24 through the main storage unit 22, and proceeds to the next step SP3.

At step SP3, the controller 20 writes either into the internal storage memory 22 or into the external storage memory 24, operation result data generated as a result of performing the predetermined operation based on the control program and the data read from the internal storage memory 22 or the external storage memory 24 in accordance with a predefined pattern, and proceeds to the next step SP4 to terminate this processing procedure for writing data RT1.

(5) Operation and Effects of the Present Embodiment

In the foregoing configuration, the robot 1 is provided with the internal storage memory 23 mounted and fixed within the body 2 and the external storage memory 24 removably mounted to the rear portion of the body 2 to appropriately use the internal storage memory 23 and the external storage memory 24 based on the control of the controller 20.

Specifically, the robot 1 stores information related to hardware for which data need not be rewritten or changed and which is desirably stored at all times; the error action execution program; and control data such as the learning data, the personality data and so on which should not be changed, in the internal storage memory 23 which is mounted and fixed within the body 2.

Conversely, the robot 1 stores environmental information including image data of the surroundings imaged by the camera unit 13 and audio data collected by the microphone 16; emotion level history data representative of the history of changes in emotion level; operation history data; system log; recognition image data for the robot 1 to recognize itself; recognized color data; audio data in accordance with an audio which is desirably outputted; action data for having the robot 1 perform a predetermined action, operation program for instructing the DSP to execute arbitrary processing; and control data such as the learning data, the personality data and so on which should be changed freely, in the removably mounted external storage memory 24.

In this case, since the external storage memory 24 can be removed from the robot 1, a variety of data written in the external storage memory 24 can be retrieved and confirmed through a monitor, data written into the external storage memory 24 can be rewritten, and the external storage memory 24 itself can be exchanged with a new other external storage memory 24.

In this way, the user can have the robot 1 freely perform a variety of actions in accordance with the user's taste without the need for rewriting the basic control program, and can read a variety of data captured through the robot 1 from the external storage memory 24 through the computer 40.

In addition, since the robot 1 has the control program stored in the removable external storage memory 24, another external storage memory 24 may be mounted instead without interrupting the operation, if the user wants the robot 1 to act even in the middle of rewriting the data contents of the external storage memory 24 through the computer 40.

According to the foregoing configuration, the robot 1 is provided with the internal storage memory 23 mounted and fixed within the body 2, and the external storage memory 24 removably mounted to the rear portion of the body 2 such that the internal storage memory 23 and the external storage memory 24 are appropriately used in accordance with the type and contents of control data through the controller 20, thereby making it possible to significantly improve the usability.

(6) Other Embodiments

While the foregoing embodiment has been described in connection with the internal storage memory 23 implemented by flash memories as fixed storage means and the external storage memory 24 implemented by a memory card as removable storage means, the present invention is not limited to these particular storage devices. Alternatively, the present invention may employ the internal storage memory 23 implemented by a hard disk and the external storage memory 24 implemented by a memory stick, in which case similar effects can be produced as in the foregoing embodiment.

Also, in the foregoing embodiment, the internal storage memory 23 is mounted and fixed within the body 3, while the external storage memory 24 is inserted into the rear portion of the body 3 for removable mounting. The present invention, however, is not limited to such particular mounting manners. Alternatively, the internal storage memory 23 may be mounted and fixed within the head 2, and the external storage memory 24 may be fitted in the back for removable mounting.

Further, while the foregoing embodiment has been described in connection with an entertainment robot to which the robot apparatus of the present invention is applied, the present invention is not limited to this particular robot, but may also be applied to any of a variety of other robot apparatus, as long as they are capable of autonomously performing actions.

Industrial Applicability

The present invention can be applied to an entertainment robot or other robot apparatuses which autonomously perform actions.

What is claimed is:

1. A robot apparatus which actuates a movable portion based on a predetermined control program to autonomously perform actions, said robot apparatus comprising:

fixed storage means fixed at a predetermined position in said robot apparatus;

removable storage means removably disposed at a predetermined position of said robot; and control means for storing control data used to operate said control program in said fixed storage means or in said removable storage means in accordance with the type of said control data or for reading control data from said fixed storage means or from said removable storage means in accordance with the type of said control data.

2. The robot apparatus according to claim 1, wherein said robot apparatus stores information related to hardware of said robot apparatus itself in said fixed storage means by said control means in addition to said control data.

3. The robot apparatus according to claim 2, wherein said information related to the hardware includes calibration information for actuating said movable portion.

4. The robot apparatus according to claim 2, wherein said information related to the hardware includes calibration information on a sensor mounted to said robot apparatus.

5. The robot apparatus according to claim 2, wherein said information related to the hardware includes product type information of said robot apparatus.

6. The robot apparatus according to claim 1, wherein said removable storage means stores said control program, and said fixed storage means stores an error action execution program operable when said movable portion does not actuate in response to said control program to instruct said movable portion to execute an operation for notifying an error state.

7. The robot apparatus according to claim 1, wherein said robot apparatus stores learning data generated by causing said movable portion to autonomously perform a predetermined action in response to an external input, and personality data providing each said robot apparatus with different characteristics in said fixed storage means as said control data by said control means.

8. The robot apparatus according to claim 1, wherein said robot apparatus comprises imaging means, and image data of surroundings imaged by said imaging means is stored in said removable storage means as said control data by said control means.

9. The robot apparatus according to claim 1, wherein said robot apparatus comprises sound collecting means, and audio data of surroundings collected by said sound collecting means is stored in said removable storage means as said control data by said control means.

10. The robot apparatus according to claim 1, wherein said robot apparatus stores error information, generated when an error occurs in said removable storage means, by said control means in addition to said control data.

11. The robot apparatus according to claim 1, wherein said robot apparatus stores still image data representative of a predetermined imaged object in said removable storage means as said control data, and said control means compares image data of surroundings imaged by predetermined imaging means disposed at a predetermined position with said still image data to recognize said predetermined imaged object.

12. The robot apparatus according to claim 1, wherein said robot apparatus stores color data of a color to be recognized in said removable storage means as said control data, and said control means recognizes a color represented by image data imaged by a predetermined imaging means disposed at a predetermined position, based on said color data.

13. The robot apparatus according to claim 1, wherein said robot apparatus stores audio data corresponding to audio outputted from predetermined audio output means in said removable storage means as said control data by said control means.

14. The robot apparatus according to claim 1, wherein said removable storage means stores action data in accordance with an action pattern for actuating said movable portion based on said control program as said control data.

15. The robot apparatus according to claim 1, wherein said robot apparatus stores an operation program associated with a signal processing unit for changing the action of said movable portion in said removable storage means as said control data by said control means by rewriting said operation program for actuating said movable portion.

16. The robot apparatus according to claim 1, wherein said robot apparatus stores learning data, generated by causing said movable portion to autonomously perform a predetermined action in response to an external input, in said removable storage means as said control data by said control means.

17. A robot apparatus which actuates a movable portion based on a predetermined control program to autonomously perform actions, said robot apparatus comprising:

storage means disposed at a predetermined position of said robot apparatus; and control means for storing said control program and control data used to execute said control program in said storage means in accordance with the type of said control data, and for reading said control data from said storage means in accordance with the type of said control data, wherein said storage means stores a change in internal states caused by said control means when said movable portion is actuated.

18. The robot apparatus according to claim 17, wherein said storage means comprises a plurality of types of emotion models for modeling a plurality of types of emotions; and said control means stores a history of changes in an emotion level in a predetermined emotion model within said emotion models, and a history of operations when said robot apparatus itself is actuated, in said storage means as said change in internal states.

* * * * *